United States Patent Office 2,752,382
Patented June 26, 1956

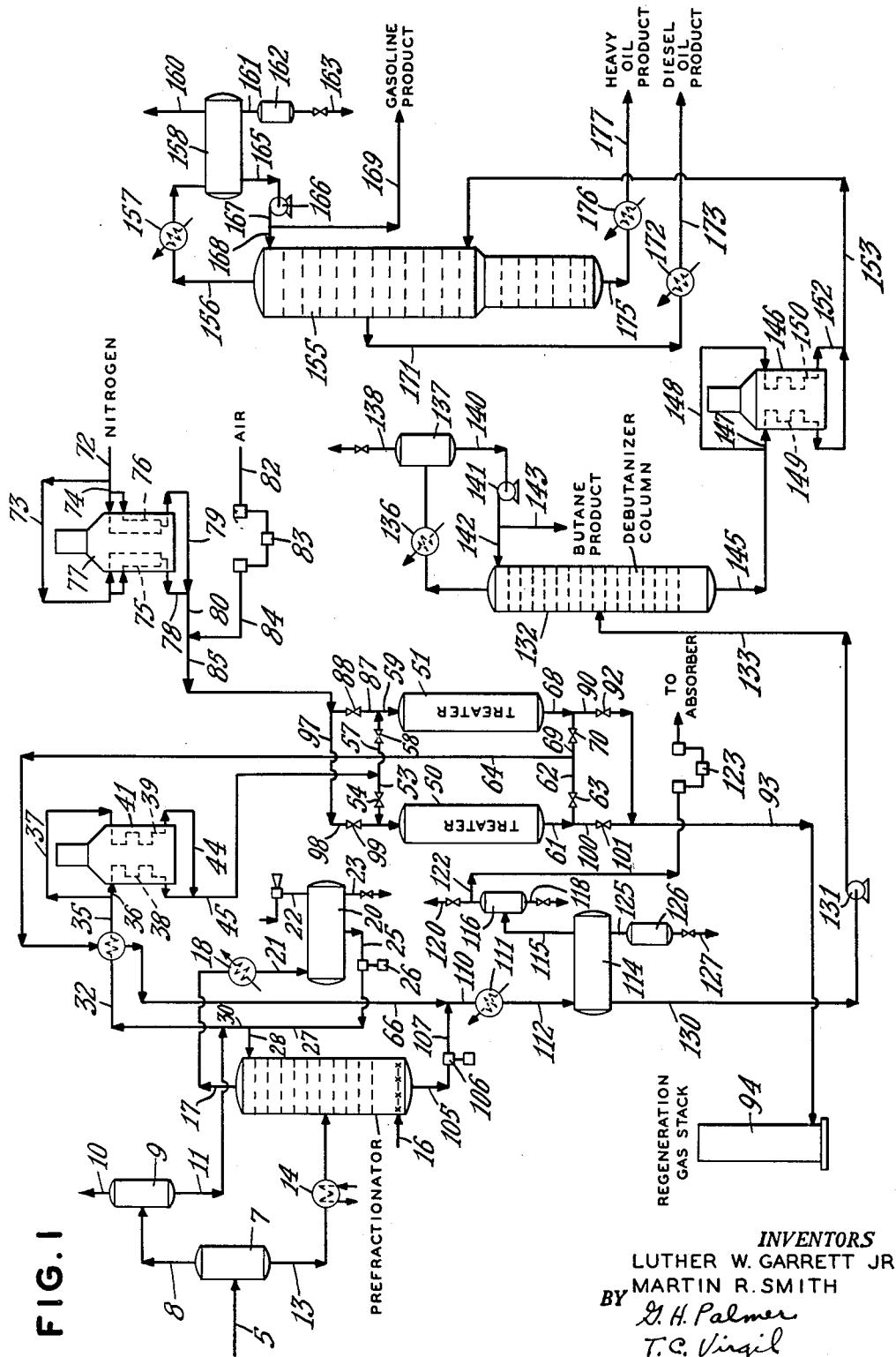

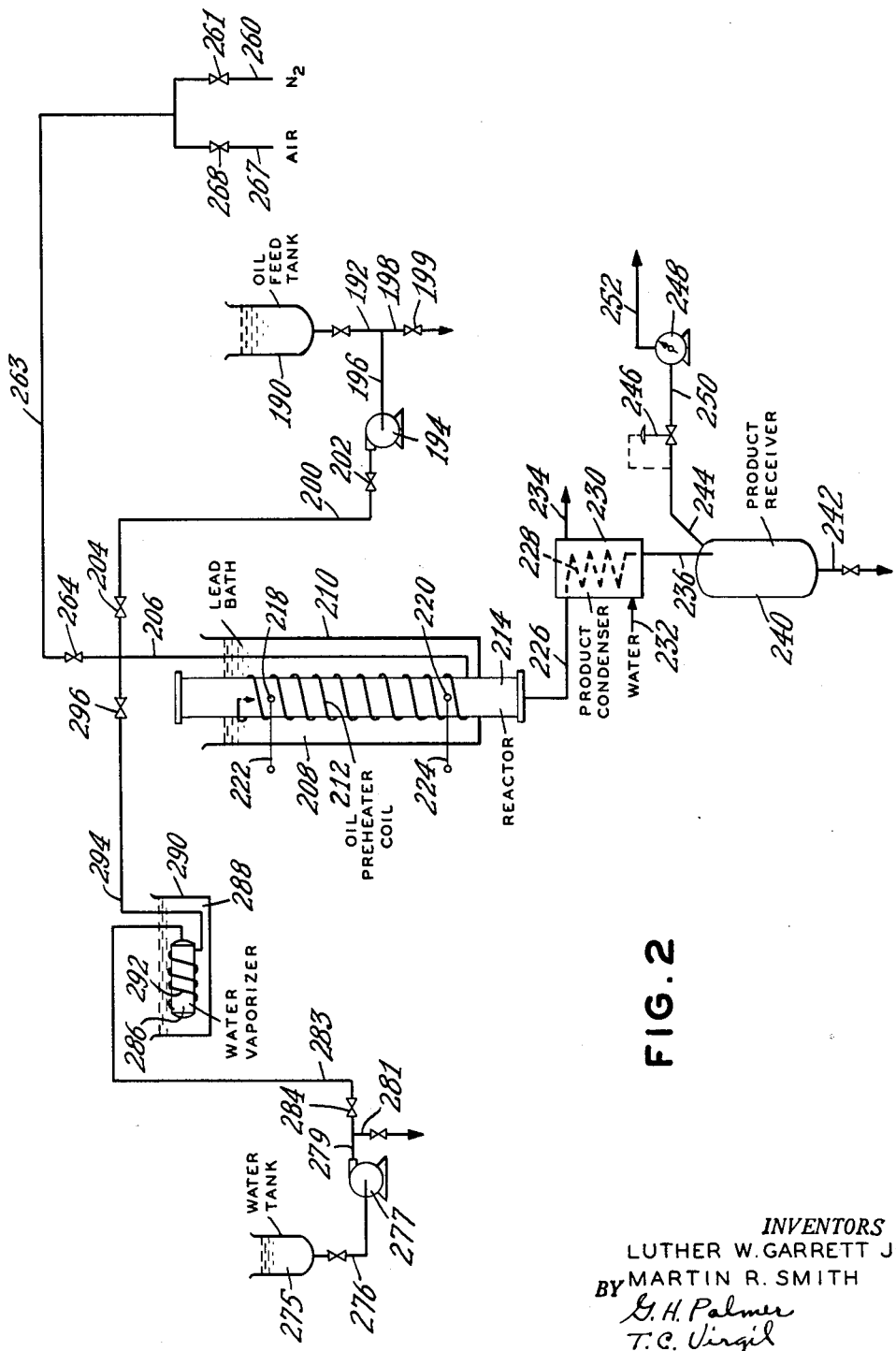

2,752,382

PROCESS FOR UPGRADING DIESEL OIL FRACTIONS DERIVED FROM FISCHER-TROPSCH SYNTHESIS

Luther W. Garrett, Jr., Levittown, N. Y., and Martin R. Smith, Glen Ridge, N. J., assignors to The M. W. Kellogg Company, Jersey City, N. J., a corporation of Delaware Application July 3, 1952, Serial No. 297,004

4 Claims. (Cl. 260—450)

This invention relates to an improved process for upgrading or treating a hydrocarbon oil containing oxygenated organic compounds to yield a product of higher octane quality and stability, and more particularly pertains to an improved process for treating an oil product derived by the synthesis of carbon monoxide and hydrogen to improve the anti-knock quality and stability of the gasoline product and the stability of the diesel fraction.

Hydrocarbon oils containing oxygenated organic compounds are subjected to an upgrading treatment in order to deoxygenate the oxygenated compounds and improve the quality of the hydrocarbon components for use as gasoline and diesel fractions. The presence of oxygenated organic compounds may render such hydrocarbon products unsuitable due to their corrosive action, or decomposition to undesired or harmful products. Hydrocarbon oils containing oxygenated organic compounds are derived, for example, from the synthesis of carbon oxides and hydrogen. The synthesis is effected in the presence of a metal containing catalyst, e. g., iron, cobalt, etc.; and hence, it is found that the product thus produced contains metal contaminants. Furthermore, the hydrocarbon oil in contact with the metal surfaces of the processing equipment, etc., picks up additional quantities of metal contaminants.

After extensive investigation, it was found that the metal contaminants cause adverse effects upon the upgrading or treating step of the hydrocarbon oil, and there is a great tendency for the metal contaminants to deposit in the equipment used for heating or vaporizing the hydrocarbon feed for the upgrading operation. In order to eliminate this difficulty, efforts were made to remove the metal contaminants from the hydrocarbon feed. Accordingly, the hydrocarbon feed containing oxygenated compounds and metal contaminants was flashed under conditions suitable to separate the heavy fraction or more commonly referred to as the wax fraction. It was felt that the metal contaminants, due to their exceptionally high boiling characteristics would remain in the wax fraction. Unfortunately, this technique proved to be of no avail, because an undesired quantity of metal contaminants were carried over with the flashed fraction during the operation. Another method tried was to distill the total synthesis product first at a pressure slightly greater than atmospheric pressure and then at atmospheric pressure, and in each case, the product material cracked excessively before sufficient quantities of gasoline and diesel oil were removed as an overhead fraction to justify economically this procedure. From these experiments, it become apparent that it would be necessary to subject the hydrocarbon feed to a treatment involving a sharp separation of the heavy wax fraction from the lighter fractions, and under such coniditions, that little or no loss occurs through decomposition of the wax fraction.

Aside from the question of metal contaminants, it was found by experimentation that upon processing a hydrocarbon oil containing the wax fraction and the diesel fraction with or without the gasoline fraction, an excessive amount of coke and normally gaseous products was obtained. In an effort to reduce the production of coke, etc., a diluent such as, for example, steam, nitrogen, etc., was employed to reduce the partial pressure of the oil, and hence, the severity of the upgrading treatment. This proved unsatisfactory, because the degree of deoxygenation decreased significantly, thus demonstrating that deoxygenation requires a severe treatment and the required conditions would also be conducive to high coke and gas production. Hence, it was decided to propose the present invention as a means of upgrading a hydrocarbon oil devoid of a wax fraction, and utilize the wax fraction in a manner resulting in increased yield, etc., of the diesel fraction.

It is an object of this invention to provide an improved upgrading treatment for a hydrocarbon material containing oxygenated organic compounds.

Another object of this invention is to provide an improved process for the upgrading of an oil product derived by the synthesis of carbon monoxide and hydrogen.

A further object of this invention is to provide a method for deoxygenating a diesel fraction containing oxygenated organic compounds.

A still further object of this invention is to provide an improved method for the stabilization of diesel fractions which are derived by the synthesis of carbon monoxide and hydrogen.

Other objects and advantages of this invention will become apparent from the following description and explanation thereof.

In accordance with the present invention, a hydrocarbon oil including oxygenated organic compounds and metal contaminants is subjected to a sharp separation to remove substantially all the metal contaminants in a relatively high boiling fraction of the hydrocarbon oil, and the separated relatively lighter boiling hydrocarbon fraction containing the oxygenated organic compounds is contacted with an alumina containing catalyst at an elevated temperature sufficient to deoxygenate the hydrocarbon oil.

In another aspect of the present invention, a hydrocarbon oil including oxygenated organic compounds, metal contaminants, diesel oil and a wax fraction is subjected to a sharp separation to remove a hydrocarbon fraction having an end point between about 650° and 750° F. and leave a heavy fraction having an initial boiling point between about 650° and 750° F. with substantially all the metal contaminants contained therein. The lighter hydrocarbon fraction is then contacted with an alumina containing catalyst at an elevated temperature to substantially deoxygenate the same.

In still another aspect of this invention, it is contemplated combining the treated relatively lighter hydrocarbon fraction with the untreated relatively heavier hydrocarbon fraction containing the metal contaminants, and then subjecting the resultant mixture to a separation treatment to produce the desired fraction of gasoline, diesel oil or wax. The recombining step serves in one instance to increase the yield of the treated product, because part of the untreated fraction is composed of hydrocarbon components boiling in the range of the desired treated fraction and due to the treating step, a portion of the heavier components in the treated fraction may be converted to lighter boiling components. Upon subjecting the mixture of treated and untreated fractions to a separation step, it is possible to incorporate part of the untreated fraction with the treated fraction without significantly affecting the stability thereof, on the basis of oxygenated organic compounds. Hence, the present invention is applicable to processing a hydrocarbon oil of any boiling range and including oxygenated organic compounds and metal contaminants. However, it is particularly adapted to processing a hydrocarbon oil including at least in addition to the above described ingredients, diesel oil and wax fractions. The hydrocarbon product derived from the synthesis of carbon oxides and hydrogen is an example of a feed material which can be processed in accordance with the present invention.

It was found that the amount of oxygenated organic compounds which are normally present in the wax fraction, i. e., the oil fraction having an initial boiling point of about 650° to about 750° F. is not great enough to seriously affect the color stability of the diesel fraction, after it has been blended with the upgraded product. Furthermore, it is found that the cetane rating of the diesel fraction may be improved as a result of the blending operation, because some of the high boiling components which are of high cetane rating in the diesel fraction would have been cracked to lower boiling materials in the upgrading treatment and this deficiency is counteracted by supplying some of the high cetane rating compounds which are present in the wax fraction. Consequently, a portion of the high boiling components in the wax fraction become part of the diesel oil and, therefore, the cetane number is improved as well as the yield. Another unexpected feature of blending the untreated heavy oil or wax fraction with the upgraded product of this invention is that the oxygenated organic compounds which are present in the heavy oil or wax fraction have a tendency to remain therein during the separation of the blend or mixture into the component fractions of gasoline, diesel oil and heavy oil or wax, and therefore, little or no adverse effects on stability results therefrom.

The present invention is applicable for improving the hydrocarbon material having present therein oxygenated organic compounds regardless of the source from which this material is derived. The hydrocarbon material can contain compounds boiling in the gasoline and/or diesel oil range in order that the advantages of this invention can be realized. When the oil constitutes diesel oil alone, it can have an initial boiling point of about 400° to about 500° F.; whereas the gasoline fraction when processed with the diesel oil can have an initial boiling point of about 85° to 325° F. and an end point of about 350° to 450° F. The present invention is particularly applicable for upgrading a hydrocarbon synthesis product. The product derived by the reaction of carbon oxide and hydrogen contains a variety of compounds boiling in the gasoline and diesel oil and heavy oil or wax fraction. In addition, the oil product from hydrocarbon synthesis contains a variety of oxygenated organic compounds of the water soluble and water insoluble types. Normally, a substantial part of the oxygenated organic compounds are removed by a simple water washing operation. It is also to be expected that a small amount of water soluble oxygenated organic compounds remain in the oil product, however, for the most part the oxygenated organic compounds which remain therein are water insoluble. Such organic compounds are of high molecular weight and thus readily solubilize with the hydrocarbon materials. Another technique which is used for the removal of at least part of the oxygenated organic compounds, as well as those materials which are normally gaseous under atmospheric conditions involves partial condensation of the reactor effluent from the synthesis operation in one or more steps. The oil product is normally condensed and further processed to improve the quality of the desired products. An unusually effective method of separation which is adapted especially for use with the present invention involves a two-stage condensation of the reactor effluent from the hydrocarbon synthesis operation. In the first condensation step, the temperature is controlled in order to condense substantially all of the heavy oil or wax fraction with or without all or a part of the diesel oil fraction. The partial condensation is effected at a temperature of about 150° to 450° F. and a pressure of about 150 to 650 p. s. i. g. Preferably, the partial condensation is effected at a temperature of about 300° F. and a pressure of about 250 p. s. i. g. In the second step, the gasoline fraction is condensed with or without all or a part of the diesel oil fraction. By this technique, the volume or quantity of the oil product which must be subjected to a preliminary separation treatment for the separation of the heavy oil having an initial boiling point of about 650° to about 750° F. is kept at a minimum. This results in reduced operating costs for the preliminary separation as well as a decrease in the equipment investment which is required for the preliminary separation. The partial condensation technique described here is carried out with sufficient fractionation such that the gasoline produced with or without all or part of the diesel oil is free of metal contaminants and wax components. This material does not contact the synthesis catalyst further, nor does it contact steel equipment for sufficient time to contaminate itself, and it therefore requires no further processing before oil treating. The metal contaminants and wax fraction are thereby concentrated in a smaller quantity of material as mentioned above. As previously indicated, it is desirable to separate the wax or heavy oil fraction having an initial boiling point of about 650° to 750° F. because of the loss of material which results in the upgrading treatment through formation of coke and normally gaseous materials, as well as the decline in catalyst activity in the upgrading treatment resulting from coke deposition and contamination of the catalyst with the metal normally used in the synthesis operation as catalyst, as well as metal which is picked up by having the oil product in contact with steel equipment or apparatus.

The separation of a relatively heavy fraction from the hydrocarbon feed involves a sharp separation, otherwise a significant quantity of metal contaminants will be present in the relatively lighter hydrocarbon fraction. In the case of a hydrocarbon oil containing a diesel oil and/or a wax fraction, an operable method is to subject the total oil to a distillation under vacuum separation. As previously indicated, a flash operation results in a significant carryover of metal contaminants with the relatively lighter hydrocarbon fraction. Depending upon the boiling characteristics of the hydrocarbon oil to be separated, the distillation under vacuum can be conducted at a temperature within the range of about 400° to 500° F. and at an absolute pressure of about 1 to 100 mm. of mercury. Hence, it should be understood that for the purposes of this specification and the appended claims "a sharp separation" is intended to include all operations which result in producing a relatively light hydrocarbon fraction substantially free of metal contaminants.

The synthesis of hydrocarbons is conducted by contacting hydrogen and carbon monoxide in suitable relative quantities over a catalyst comprising a group VIII metal or a carbide of a group VIII metal. Generally, on a volumetric basis, about 0.5–10:1 of hydrogen to carbon monoxide are employed in the reaction. In the case of the iron type of catalyst, it is preferred to use about 1–7:1 of hydrogen to carbon monoxide, on a volumetric basis. In this respect, cobalt and nickel types of catalysts yield better results by using the preferred volumetric ratio of hydrogen to carbon monoxide in the order of about 2–5:1. The hydrogen and carbon monoxide are reacted in the presence of the synthesis catalyst in vapor or liquid phase. The iron catalyst is employed as, for example, a precipitated iron type derived by reacting an iron salt with a suitable reagent to form iron oxide. Another iron type of catalyst is prepared by fusing iron oxide with an alumina and with or without a suitable metal compound, such as for example, the carbonate, hydroxide or oxide of sodium, potassium, etc. Ordinarily, the cobalt and nickel catalysts contain the catalytic agent supported on a carrier material, such as for example, kieselguhr, alumina, fuller's earth, pumice, silica-alumina, activated carbon, etc. Oftentimes, cobalt and nickel in the suitable form are precipitated as a basic carbonate on the carrier material in the preparation thereof. An alkali metal oxide is a suitable promoter which is preferably used with the iron type of catalyst. This promoter serves to promote the reaction between hydrogen and carbon monoxide and results in higher yields for a given reaction, than is ordinarily obtained without the use thereof. Generally, the group VIII metal types of catalyst are either partially or completely reduced before use in the synthesis operation.

Other types of catalyst which have been used for synthesis reactions involving carbon monoxide and hydrogen are, for example, cobalt-magnesia-thoria-kieselguhr, nickel-manganese-alumina-kieselguhr, zinc oxide-alumina-thoria, molybdena-alkali metal oxide, chromia-alkali metal oxide, etc. Another group VIII metal which has been used successfully for the synthesis of high boiling hydrocarbons from hydrogen and carbon monoxide is ruthenium and its related compounds.

Usually, when a group VIII metal or its related compound is supported on a carrier material for use as a catalyst in a synthesis operation, about 15 to about 50% by weight of the total catalyst constitutes the group VIII metal, etc. In the case of using a promoter for the synthesis catalyst, generally, about 0.1 to about 2% by weight of alkali metal oxide is employed based on the weight of iron calculated as metallic iron.

The synthesis reaction is usually conducted at a temperature of about 300° to about 700° F. In the case of an iron type of catalyst, it is preferred to employ a temperature of about 450° to about 700° F. With a cobalt or nickel type of catalyst, it is preferred to employ a temperature of about 350° to about 475° F. At these temperatures, the reaction pressure may vary from about 1 atmosphere to about 650 p. s. i. g. Synthesizing hydrocarbons with an iron type of catalyst is preferably conducted at a pressure in the order of about 80 to about 600 p. s. i. g. The cobalt type of catalyst gives better results at a preferred pressure of about 1 atmosphere to about 250 p. s. i. g. The nickel type of catalyst is preferably used at a reaction pressure in the order of about 1 atmosphere to about 75 p s. i. g. The relationship between the quantity of synthesis gas and the catalyst which is present during the reaction period is conveniently expressed as the volumetric space velocity, namely, the volume of synthesis gas (CO+hydrogen measured at 60° F. and 760 mm.), which is supplied to the reaction zone on an hourly basis per volume of catalyst which is present in the reaction zone. Usually, for the synthesis operation, the volumetric space velocity may vary in the range of about 100 to about 5000 $V_o$/hr./$V_c$. In the case of an iron catalyst, it is preferred to use about 100 to about 500 $V_o$/hr./$V_c$; whereas the space velocity for a nickel or cobalt type of catalyst is about 100 to about 1000 $V_o$/hr./$V_c$. Although not obligatory, the synthesis operation is conducted for recycling of the normally gaseous material to the reaction zone. This recycle gas is customarily referred to as a tail gas and it is recycled usually at a rate of about 0.5–3.5:1 on a volumetric basis, based on the fresh feed throughout. In the case of an iron type of catalyst, it is preferred to control operating conditions in order to maintain less than about 16% by volume of carbon monoxide in the feed gas and also preferably less than about 25% carbon dioxide in the inlet feed gas.

The synthesis of hydrocarbons can be conducted as either a fixed or moving bed system involving a fluid or non-fluid technique. In the non-fluid operation, the catalyst is employed as a pelleted or granular material; whereas for a fluid operation the catalyst is in a finely divided form having a particle size in the range of about 5 to about 250 microns, preferably about 10 to about 100 microns. In the fluid system, the catalyst is fluidized by the upward passage of gaseous material through a mass of finely divided catalyt material at a superficial linear gas velocity in the order of about 0.5 to about 25 feet per second, more usually, about 1 to about 7 feet per second. In a high velocity reaction system, the superficial linear gas velocity of the reactants is in the order of about 4.5 to about 7 feet per second.

The oil product from the synthesis operation having included therein water insoluble oxygenated organic compounds and water soluble oxygenated organic compounds is treated in accordance with the present invention in order to upgrade the quality and stability of the gasoline and diesel products. This upgrading involves deoxygenating the oxygenated organic compounds and isomerizing the olefins which are present in the feed materials. The present invention is effective for the deoxygenation of oxygenated organic compounds whether they are water soluble or water insoluble. As a practical matter, it is desirable to separate as much of the oxygenated organic compounds as is possible from the oil product in order to decrease the cost of operating the upgrading treatment. In this manner, a substantial part of the oxygenated organic compounds can be advantageously utilized for specific purposes. Generally, the hydrocarbon oil to be treated contains about 0.02 to about 0.5 m. e./gm. acidity. If the diesel oil alone is processed, about 0.004 to about 0.25 m. e./gm. acidity is usually encountered; whereas with the gasoline fraction about 0.03 to about 0.7 m. e./gm. acidity is usually found. Generally, the upgrading treatment is conducted at a temperature in the order of about 700° to about 950° F., preferably about 750° to about 850° F. The operation can be accomplished by employing atmospheric pressure, however, higher pressures can be used in order to facilitate material handling problems, etc. For this purpose, a reaction pressure in the order of about 0 to about 100 p. s. i. g. can be used advantageously, preferably about 0 to about 20 p. s. i. g.

The material to be upgraded is contacted with the catalytic material containing alumina. The catalyst can be solely alumina or alumina in combination with silica or another suitable catalytic material. For the purpose of this specification and the appended claims, it is intended to include generically alumina alone and alumina with another component, e. g., silica, by the term "alumina containing catalyst." Better results are obtained in the use of silica and alumina containing catalysts over a catalyst comprised of alumina alone, although an alumina catalyst is useful for the purposes of this invention. Specific examples of catalyst which are used for the purpose of upgrading oil products containing oxygenated organic compounds are bauxite; "Porocel"; activated alumina; alumina gel; silica-activated alumina; Montmorillonite clays, such as for example, "Superfiltrol"; synthetic alumina cracking catalysts; etc. In the case of silica-alumina containing catalysts, generally about 70 to about 99% of the catalyst contains silica and the remainder about 1 to about 30% by weight is alumina, based on the total weight of the catalyst. It is preferred, however, to have about 75 to about 90% of silica and about 25 to about 10% of alumina in the catalyst for this invention. Generally, the catalytic material should have not more than about 0.2% by weight of iron (calculated as $Fe_2O_3$), preferably not more than about 0.1% of iron calculated as $Fe_2O_3$. This impurity adversely influences the upgrading treatment, thus catalysts free of same are preferred.

The oil product to be upgraded is brought into contact with a catalytic material in the vapor phase for a period of about 1 to about 50 hours, preferably about 2 to about 12 hours. It is convenient to express the relative quantities of feed and catalytic material employed in the reaction in terms of the volumetric space velocity which is defined as the volume of liquid feed charged to the reaction zone on an hourly basis per volume of catalyst which is present in the reaction zone. Generally, the space velocity is about 0.2 to about 20 $V_o/hr./V_c$, preferably in the range of about 2 to about 5. As a result of treating the liquid product with the catalytic material under reaction conditions, a carbonaceous material is deposited on the catalyst which causes a decline in catalytic activity. The drop in catalyst activity is temporary, because a catalyst can be regenerated by burning the carbonaceous material with an oxygen-containing gas. Ordinarily, air or oxygen can be used for this purpose, however, in view that small quantities of carbonaceous material are formed in the process, it is desirable, for the sake of temperature control, to employ diluted air for the regeneration of the catalyst. If a highly concentrated form of an oxygen-containing stream were employed for the regeneration of the catalyst, there is a tendency for excessive temperatures to occur by reason of the difficulty to control the regeneration temperature. The regeneration gas stream generally contains about 1 to about 10% by volume of oxygen, preferably about 2 to about 5% by volume of oxygen. The regeneration is usually conducted at a temperature of about 700° to about 1200° F., preferably about 900° to about 1050° F. At the temperature specified, the regeneration can be effected at atmospheric pressure or it can be effected at the same pressure employed for the reaction phase of the process. Accordingly, the pressures specified above for the upgrading treatment can also be employed for the regeneration step.

The upgrading operation can be accomplished as a fixed or moving bed system involving the fluid or non-fluid technique. By reason that the quantity of coke formed in the upgrading treatment is relatively small compared to other operations, the reaction phase or period of operation may run for about 1 to about 40 hours in the case of a fixed bed non-fluid system. In the preferred instance, the reaction period is conducted for about 2 to about 8 hours. The regeneration cycle or period may be operated for the same length of time as the reaction period, however, generally, it is accomplished in less time than the reaction period. The time of regeneration is limited only by the time required to supply the necessary amount of oxygen to burn the deposits, at a rate such that the temperature of the catalyst is controlled at 1050° F. or less. In a fixed bed system, it is desirable to employ at least two vessels for the upgrading treatment. In this manner, it is possible to maintain a continuous flow of processing materials. While one vessel is processing or upgrading the liquid product, the other vessel is being regenerated. The fixed bed system may involve either fluid or non-fluid techniques, depending upon the size of the catalytic material. For a fluid system, the catalyst is used as particles having a size in the order of about 2 to about 250 microns, or more usually, about 10 to about 100 microns. The finely divided catalytic material is capable of being fluidized by the upward passage therethrough of the gaseous reactant at a superficial linear gas velocity of about 0.1 to about 50 feet per second, more usually, about 1 to about 6 feet per second. In the conventional dense phase operation, it is preferred to use a superficial linear gas velocity in the order of about 0.2–2.0 feet per second. On the other hand, it is also contemplated using the high velocity catalyst circulation system in which the superficial linear gas velocity is in the order of about 4.5 to about 7 feet per second. For a moving bed system, a separate vessel is employed as the regenerator and another vessel as the reactor. After the fluid catalyst has been in the reaction zone for a given period of time, it is contaminated with carbonaceous materials which lower its activity, thus it is continuously withdrawn from the reaction zone and circulated to the regeneration zone wherein the contaminating deposits are removed by combustion. A continuous stream of regenerated catalyst is recirculated to the reaction zone. There is greater flexibility of operation in a fluid system and, in some cases, it is a highly desirable method of operation.

In the upgrading treatment, it is also contemplated employing an inert diluent for the purpose of reducing the oil partial pressure and thus the severity of the treating step. While this is not necessary for the purposes of this invention, it may, under certain conditions, where the oil feed contains an unusual amount of diesel oil, be especially effective. Accordingly, inert diluents can be used in the amount of about 10 to about 5000 standard cubic feet per hour (measured at 60° F. and 760 mm.) preferably about 500 to about 2000 s. c. f. per barrel of oil feed. The inert diluent includes any material which is gaseous under reaction conditions and which will not react or decompose. Specific examples of the inert diluent are steam, nitrogen, normally gaseous hydrocarbons, such as for example, methane, ethane, etc.

In the case of processing a hydrocarbon material, including a diesel oil and a wax fraction, the separated relatively lighter fraction has an end point of about 650° to about 750° F. Ordinarily, the end point specified is sufficient to eliminate in the heavier boiling fractions those components which have a high tendency to produce carbon and/or normally gaseous materials under treating conditions as well as the metal contaminants. In the case of upgrading the oil product from a hydrocarbon synthesis operation, the selection of an end point for the feed material is dependent upon the type of catalyst employed in the synthesis operation in order to obtain optimum results. For example, the use of an iron type of catalyst in the synthesis operation, produces a product containing relatively less wax or heavy oil material than a synthesis operation in which cobalt is employed as the catalyst. Since less wax or heavy boiling material is produced in the synthesis operation using the iron type of catalyst, it is preferred to use as a feed material in the treating operation one which has an end point of not more than about 650° F. Similarly, in the case of upgrading or treating a liquid product which was produced in a synthesis operation employing a cobalt type of catalyst, it is preferred to employ as a feed material to the treating operation one which has an end point of not greater than 750° F. Various gradations of end points of feed materials to the treating operation can be used depending upon the quantity of wax material and the boiling characteristics thereof which are present in the synthesis liquid product. The quality of the diesel oil fraction in the liquid product derived from the synthesis operation using the cobalt type of catalyst warrants raising the end point of the diesel fraction in order to obtain the utmost benefits therefrom. On the other hand, a diesel cut having an end point not greater than 650° F. in the case of synthesis by means of an iron type catalyst is preferred because the quantity of the material boiling above about 650° F. may not warrant its being included with the diesel oil fraction to be treated.

In order to more fully understand the present invention, reference will be had to the accompanying drawings wherein specific examples of the present invention are illustrated.

Figure 1 is an illustration of a commercial operation embodying the principle of the present invention; and Figure 2 is a schematic diagram of a test unit employed for the purpose of evaluating this invention.

In Figure 1, the reactor effluent from a synthesis operation is introduced via line 5 from a synthesis operation using iron catalyst at 600° F. and 250 p. s. i. g. into a fractionating tower shown schematically as 7. The conditions in tower 7 involve a top temperature of 255° F., a bottom temperature of 300° F. and a pressure of 235 p. s. i. g., thus causing a preliminary separation of the reactor effluent at the rate of 258 B. P. D. of a material having a gravity of 34.2° API from the bottom thereof. The uncondensed material passes overhead from the top of tower 7 through a line 8 and enters a separating drum 9. In separating drum 9, the temperature is 100° F. and the pressure is 230 p. s. i. g., thus causing a condensation of the liquid product at the rate of 2040 B. P. D. which has a gravity of 65.8° API. The uncondensed material in separating drum 9 is passed overhead through a line 10; whereas the liquid product is removed from the bottom thereof by means of a line 11. The liquid which is separated in the tower 7 is removed from the bottom thereof by means of a line 13 and then it is preheated by means of a heater 14 prior to being fed into the central section of a vacuum distillation tower 15. In preheater 14, the liquid product gains 543,000 B. t. u. per hour prior to being introduced into the prefractionator 15. The prefractionator is operated under vacuum with a pressure of 53 mm. at the top thereof and a corresponding temperature of 390° F. In the bottom of the prefractionator, the pressure is maintained at 96 mm. absolute with a temperature of 303° F. A higher operating pressure for the prefractionator is made possible by introducing steam via a line 16 at a rate of 40 pounds per hour having a pressure of 35 p. s. i. g. As a result of the conditions existing in the prefractionator, all of the compounds boiling below about 650° F. at atmospheric pressure are removed overhead by means of a line 17. The overhead vapor product flows through line 17, and then it is condensed by means of condenser 18, before passing into accumulator 20 by means of line 21 connected thereto. The vacuum is maintained in the fractionating system by means of a steam injector 22 which is connected to the top side of accumulator 20 at the end opposite to the point of introduction of the overhead vapor stream from the prefractionator 15. Any water which may be present in the system is removed by means of a valved line 23 which is connected to the bottom side of the accumulator 20. The condensed liquid in the accumulator 20 is withdrawn from the bottom thereof by means of a line 25 and it is transported by pump 26 through line 27, so that one portion is returned to the top of the prefractionator 15 through a recycle line 28 at the rate of 107 barrels per day of liquid having a gravity of 36.4° API and the remainder is passed through a line 30 at the rate of 181 B. P. D. The condensed liquid product from the separating drum 9 flowing through the bottom line 11, joins with the liquid in line 30 and the combined stream flows through a line 32 prior to passing through a heat exchanger 33. Prior to entering the heat exchanger, the liquid stream is at a temperature of 97° F. and at a pressure of 70 p. s. i. g., and after leaving exchanger 33, the temperature is raised to 500° F. and the pressure is 65 p. s. i. g. After leaving the exchanger 33, the material to be upgraded passes through a line 35 which then divides so that approximately equal portions pass through lines 36 and 37 which feed into the furnace coils 38 and 39, respectively, in furnace 41. The feed material was vaporized in furnace 41 and then flows therefrom by means of lines 43 and 44 which join into a single line 45 prior to being charged to the treating operation.

The treating operation involves two treaters 50 and 51 which are operated intermittently for the upgrading or treating of the synthesis product. For example, when treater 50 is employed for the upgrading, the feed material passing through line 45, first flows through a line 53 and valve 54 and thence through a line 55 which is connected to the top of treater 50. When the other treater 51 is in operation, the feed material is allowed to pass through line 45 and then through line 57 and valve 58 before entering the top of treater 51 through a line 59. The treated product leaves the bottom of the treater, for example, treater 50, through a line 61 before passing through a line 62 containing a valve 63. The treated product passes through line 62 into a product line 64 before flowing into a heat exchanger 33, wherein the heat contained in the treated product vapor is indirectly exchanged with the feed to the treating operation. As a result of heat exchanger 33, the vapors of the treated product are condensed and thence flow therefrom through a line 66. When treater 51 is operating on the reaction cycle, the treated product leaves the bottom thereof through a line 68 and thence through a line 69 in which is contained a valve 70 before entering product line 64.

While one treater is being employed for upgrading the synthesis product the other is undergoing regeneration in order to revivify the catalyst. To accomplish this purpose, nitrogen is fed from a source 72 and is divided to allow approximately half portions to flow through each of lines 75 and 76, respectively, situated within furnace 77. As a result of heating in the furnace, the temperature of the nitrogen is increased to about 700–1050° F., when feeding the same at the rate of 22,900 pounds per hour. The heated nitrogen leaves the respective coils 75 and 76 in the furnace through lines 78 and 79, respectively, prior to combining as a single stream in line 80. Air is supplied through a source 82 at the rate of 2390 pounds per hour and at a temperature of 100° F. By means of compressor 83 the air stream increases in pressure to 25 p. s. i. g. and then passes through a line 84 before combining with the nitrogen as a single stream in line 85. The regeneration gas comprising a mixture of air and nitrogen serves to regenerate the catalyst in treaters 50 and 51 in an intermittent fashion. While one treater, for example, treater 50, is processing a synthesis product, the other treater, namely, treater 51, is being regenerated by the passage of the regeneration gas through a line 87 containing a valve 88. The flue gases resulting from the combustion of the carbonaceous material on the catalyst pass from the bottom of treater 51 through line 68 and thence into a line 90 containing valve 92. The flue gas passes into a vent line 93 which is connected to the base of a regeneration gas stack 94. While treater 51 is in the reaction cycle treater 50 is regenerated by passing the regeneration gas in line 85 through a line 97 and thence through a line 98 containing a valve 99 before entering the top of treater 50 by means of line 55. As in the case of treater 51, the flue gas resulting from the combustion of the carbonaceous deposits on the catalyst leaves the bottom of treater 50 through line 61 and thence passes through a line 100 containing a valve 101 before entering the gas stack 94 by means of a vent line 93.

The upgrading treatment of the synthesis product is conducted at a temperature of 800° F. and an outlet reaction pressure of 10 p. s. i. g. The regeneration step or cycle is effected at a temperature of 1050° F. (maximum) and at an outlet pressure of 5 p. s. i. g. The catalyst in the treating vessels 50 and 51 occupy 6.5 feet of length thereof, and each vessel has an internal diameter of 5 feet. The catalyst employed is 23% by weight alumina and the remainder silica, occupying about 160 cubic feet of vessel space.

The wax fraction of heavy oil separated in prefractionator 15 is yielded from the bottom thereof from a line 105 before being pumped by means of pump 106 through line 107. The wax fraction is produced at the rate of 77 B. P. D. and has a gravity of 29° API. The wax fraction combines with the treated product which is flowing through line 66 and as a combined stream they flow through a line 110 before being cooled in a cooler 111. This cooler has a capacity of 4,650,000 B. t. u. per hour. The temperature in line 110 of the combined stream is 290° F. and as a result of cooler 111, the temperature is decreased to about 100° F. The cooled combined stream leaves the cooler 111 and then by means of line 112 passes into accumlator 114. Any gaseous materials which are present in the accumulator pass overhead therefrom by means of line 115 and thence into trap drum 116. Any liquid condensate which is present in the gas stream is removed from trap 116 by means of a valved line 118 which is connected to the bottom thereof. On the other hand, the gaseous material can be vented to the atmosphere by means of a valved vent line 120 which is connected to the top of trap 116. The normally gaseous materials which are present in trap 116 flow overhead therefrom by means of a line 122 and then they are compressed by means of a compressor 123 before being passed to the absorption system (not shown), wherein normally gaseous hydrocarbons are recovered. As a result of the upgrading treatment, water is present in the upgraded product and this is removed from the bottom of accumulator 114 by means of a line 125 which is connected to a water drum 126. The water is discharged at the rate of 249 pounds per hour through a valved vent line 127 which is connected to the bottom of drum 126.

The condensed liquid product in accumulator 114 is discharged from the bottom thereof by means of line 130 and then it is conveyed by pump 131 to a stabilizer column 132 via line 133. In the stabilizer column, the butanes contained in the feed material are removed overhead as a vapor through a line 135, condensed in a condenser 136 before passing into a drum 137. Drum 137 is equipped with an overhead valved vent line 138 which could be used to remove gases from the system when desired. The condensed butanes in separator 137 are discharged from the bottom thereof through a line 140 and then they are transported by means of pump 141, so that 3583 B. P. D. are recycled to the top of stabilizer tower 132 via recycle line 142 and the remainder, 1502 B. P. D., is yielded from the system via line 143.

The debutanizer column 132 is operated at a top temperature of 155° F. and a bottom temperature of 420° F. with the pressure in the bottom of the tower being maintained at 235 p. s. i. g. The debutanized liquid in the bottom of tower 132 is removed therefrom by means of a bottom line 145 before being divided into approximately equal portions and passed into the furnace 146 via lines 147 and 148. The debutanized material passes through coils 149 and 150 in the furnace and thence leaves through lines 151 and 152, respectively. The combined streams in lines 151 and 152 which leave from the furnace pass through a single line 153 before entering fractionating tower 155. The debutanized material is separated into three main products, namely, an overhead stream, a side stream and a bottom stream. The overhead stream in the vapor state passes through a line 156 before being condensed in a condenser 157 and thence passing to an accumulator 158. The accumulator is maintained open to the atmosphere by means of a line 160. Any water which is present in the overhead stream is removed from the bottom of the accumulator 158 by means of a line 161, thence through a trap drum 162 before being discarded from the bottom thereof by means of a valved line 163. The condensed liquid in accumulator 158 is removed from the bottom thereof by means of line 165 and is conveyed by pump 166 through line 167 before dividing into lines 168 and 169. The liquid product in line 168 is recycled to the top of tower 155 at the rate of 1570 B. P. D. The remainder of the liquid product is gasoline, and it is passed to storage (not shown) at the rate of 2661 B. P. D., which has a gravity of 68.8° API. The diesel oil fraction is removed from the middle section of the upper part of tower 155 through a line 177 before being cooled by means of cooler 172. The cooled diesel oil is passed by means of line 173, leading from the cooler 172, to storage (not shown). A heavy oil or wax product is discharged from the bottom of fractionator 155 by means of a line 175, cooled by means of a cooler 176 and passed to storage (not shown) by means of line 177. The diesel oil product is produced at the rate of 142 B. P. D. and has a gravity of 36.6° API. The heavy oil product is yielded at the rate of 46 B. P. D. and has a gravity of 29.5° API.

Various experiments were conducted on a laboratory scale in order to evaluate various conditions for upgrading treatment of hydrocarbon materials containing oxygenated organic compounds. Figure 2 contains a schematic illustration of a laboratory test unit which was used for the purpose of evaluating the upgrading treatment of various hydrocarbon materials.

In Figure 2 the hydrocarbon material was supplied from an oil feed tank 190 and passed from the bottom thereof by means of a valved vent line 192 which was connected to the suction side of a pump 194 by means of line 196. The oil could be discharged from tank 190 by means of a line 198 containing a valve 199 which was connected to the tank bottom by line 192. The oil feed was pumped through the discharge line 200 of the pump containing a valve 202. When the oil feed was discontinued, valve 202 was maintained in a closed position in order to avoid any back-flow of processing materials which may have leaked through another valve 204 which was located at the other end of line 200. The oil feed was passed through a line 206, part of which was submerged in a molten lead bath 208 contained in an open ended vessel 210.

Line 206 extended approximately the entire length of the open ended vessel 210, which contained a molten lead bath, and then it was wound as a coil 212 around the reactor 214, which was also submerged in the molten lead bath for about 24 inches of its length. Coil 212 serves to preheat the oil feed to the desired temperature, and it covers a substantial part of the length of the reactor before entering through the wall thereof at a point about 4 inches from the top end. Coil 212 terminated as the oil inlet within the reactor vessel 214. The reactor was a vessel 30 inches in length and had an internal diameter of 1 inch. The catalytic material in the granular or pelleted form occupied 21 inches of its length for a total volume of 230–250 cc. The reaction temperatures were indicated by two thermocouples, one located at a point 218 about 4 inches from the top of the catalyst bed and the other located at a point 220 about 3 inches from the bottom of the catalyst bed. The thermocouples were extended through the wall of the reactor vessel to the center and are shown schematically in the drawings as extensions 222 and 224 for points 218 and 220, respectively. The reaction product was discharged from the bottom of the reactor through a line 226 and this line joined with a coil 228 contained within a closed vessel 230. The coil 228 was surrounded by cooling water which was introduced into vessel 230 by means of an inlet 232 located at the bottom thereof and it was discharged from the top of vessel 230 by means of a line 234. The reaction product was cooled at substantially the same pressure as existed within the reactor. The total product passed through coil 228 and then entered a product receiver 240. The product receiver was equipped with a valved line 242 at the bottom thereof for discharging the condensed liquid and also with an overhead vapor gas line 244 which was connected to the top thereof. The pressure within the receiver was maintained at the desired level by means of a control valve 246, and thence the material passed from the suction side of a wet test gas meter 248 by means of a line 250. After the normally gaseous material was measured, it was vented from the system by a line 252.

When nitrogen was employed as a diluent for the upgrading treatment, it was supplied from a source 260 which contained a valve 261. The nitrogen then passed from line 261 into a header 263 which contained a valve 264 to prevent leakage from line 206, when nitrogen was not being used or any other gas from the same header. Line 263 which served to supply the nitrogen, is connected to line 206 whereby materials are introduced into the reactor. Similarly, air is supplied through a line 267 which contains a valve 268. The air can flow into the header 263, which as previously explained is connected to line 206. In some experiments, steam was employed as a diluent in order to avoid introducing more variables than are desired, the steam was generated by vaporization of water. For this purpose, a water tank 275 served as the supply of water which was discharged from the bottom thereof through a valved line 276 to the suction side of a pump 277. The water was discharged through a line 279 which contained a valved bleed line 281, which served to empty the discharge line of the pump whenever desired. Line 279 is also connected to a line 283 in which is contained a valve 284 which leads to a water vaporizer drum 286. The vaporizer drum is submerged in a molten bath of lead 288 contained within an open ended vessel 290. The water is introduced into the vaporizer drum by means of line 283 at one end thereof and heated material emerges from the other end by means of line 292, which is coiled around the outer surface of drum 286. The coiled line 292 terminated outside of the molten bath in a line 294, and this in turn is connected to line 206. Line 294 also contained a valve 296 which serves to prevent a back-flow of materials from line 206 into the vaporizer drum 286.

In operation the steam produced in the water vaporizer contained a temperature of about 750° to about 850° F. (reaction temperature). The conditions which existed in the product condenser reduced the temperature of the reactor effluent from about 750°–850° to about 50°–90° F. The other conditions existing in the experiments performed are described in the results reported hereinbelow.

Utilizing the same equipment which is illustrated in Figure 2, various types of hydrocarbon materials were evaluated by contacting the same with a material containing 77% silica and 23% alumina and 0.04% of iron calculated as $Fe_2O_3$, based on the total weight of the catalyst, and which is designated as Catalyst A in the following tables of data.

The various hydrocarbon materials employed in the laboratory experiments are given in Table I below.

Table I

| Feed Designation | I | II | III | IV | V | VI | VII |
|---|---|---|---|---|---|---|---|
| °API Gravity | 42.2 | 55.1 | 53.3 | 53.0 | 48.5 | 56.8 | 48.4 |
| ASTM Distillation, F°. | | | | | | | |
| IBP | 180 | 101 | 174 | 182 | 218 | 117 | 204 |
| 5 | 240 | 130 | 240 | 250 | 271 | 148 | 256 |
| 10 | 260 | 150 | 254 | 259 | 281 | 166 | 270 |
| 20 | 291 | 180 | 266 | 272 | 302 | 196 | 291 |
| 30 | 314 | 212 | 274 | 279 | 324 | 224 | 312 |
| 40 | 356 | 246 | 288 | 292 | 343 | 252 | 337 |
| 50 | 384 | 280 | 300 | 312 | 373 | 285 | 366 |
| 60 | 423 | 320 | 314 | 328 | 407 | 323 | 400 |
| 70 | 471 | 374 | 330 | 346 | 452 | 370 | 444 |
| 80 | 536 | 444 | 350 | 364 | 507 | 439 | 505 |
| 90 | (1) | (2) | 368 | 392 | 576 | 552 | 580 |
| 95 | | | 388 | 413 | 617 | 628 | 632 |
| E. P. | | | 416 | 434 | 644 | 653 | 650 |
| Acidity, m. e. of acid/gm. of sample | 0.25 | 0.147 | 0.15 | 0.12 | 0.04 | 0.028 | 0.078 |
| Water Washed Oil: | | | | | | | |
| Acidity, m. e./gm | 0.21 | 0.072 | | | | | |
| Iron Content, Wt. Percent (As $Fe_2O_3$) | 0.13 | 0.008 | | | | | |
| Distribution of Oil, Vol. Percent: | | | | | | | |
| Gasoline 430° E. P. | 57.7 | [3] 74.6 | | | | | |
| Diesel Oil 650° E. P. | 21.8 | 17.0 | | | | | |
| Wax (650° F.+) | 20.5 | 8.4 | | | | | |
| 430° F. E. P. Gasoline: | | | | | | | |
| Acidity, m. e./gm | 0.165 | 0.05 | | | | | |
| RVP, p. s. i. | 0.8 | 5.8 | | | | | |
| CFRM clear | 37.6 | 54.8 | | | | | |
| Feed Source for IBP–650° F. or IBP–430° F. Fraction | | | I | I | I | II | I |
| Wt. Percent of Fraction based on feed source | | | | | 82.4 | 94.3 | 83.1 |

[1] Cracked at 580° F., 88%.
[2] Cracked at 460° F.
[3] 400° E. P.

The total liquid product which was derived from a synthesis operation was treated in the laboratory equipment shown in Figure 2. The results of these experiments are reported in Table II below.

Table II

| Run No. | 1 | 2 | 3 | | | 4 |
|---|---|---|---|---|---|---|
| Feed | I | I | II | | | II |
| Catalyst | (1) | (2) | (1) | (1) | (1) | (1) |
| No. of Regenerations | 0 | 0 | 0 | 0 | 0 | 0 |
| Length of Run, Hrs | 1.27 | 1.62 | 3 (0–3) | 2 (3–5) | 1 (5–6) | 1.12 |
| Operating Conditions: | | | | | | |
| Temperature, °F | 795 | 800 | 800 | 800 | 800 | 800 |
| Outlet pressure, p. s. i. | 15 | 15 | 15 | 15 | 15 | 10 |
| Vol. of Catalyst, cc. | 236 | 250 | 230 | 230 | 230 | 230 |
| Vol. of feed (cc.) per Vol. of Cat. (cc.) | 4.9 | 8.9 | 23.5 | 23.5 | 23.5 | 4.7 |
| Feed rate, cc./hr | 910 | 1,370 | 890 | 890 | 890 | 960 |
| $H_2O$ rate, cc./hr | 0 | 0 | 0 | 0 | 0 | 150 |
| $N_2$ rate, S. C. F. H | 0 | 11 | 9 | 9 | 9 | 5 |
| Yields (Output Basis): | | | | | | |
| 100% $C_4$ Gasoline (430° E. P.), Vol. percent | 79.8 | 71.7 | 84.0 | 84.7 | 80.3 | 89.0 |
| $C_4$ free Gasoline (430° E. P.), Vol. percent | 73.4 | 69.5 | 74.6 | 78.0 | 78.6 | 83.2 |
| Diesel Cut (650° E. P.), Vol. percent | 12.7 | 20.5 | 7.5 | 10.3 | 13.5 | 9.7 |
| Polymer (650+), Vol. percent | 6.1 | 8.7 | 1.8 | 2.9 | 3.2 | 2.2 |
| $H_2O$ produced, Wt. percent | | | 0.6 | 1.9 | 1.3 | |
| Product Gas, Wt. percent | 3.0 | 2.6 | 9.2 | 2.3 | 2.1 | 2.2 |
| Carbon, Wt. percent | 4.1 | 0.5 | 0.4 | 0.4 | 0.3 | 1.3 |
| Inspections: | | | | | | |
| $C_5$–430° E. P. Gasoline— | | | | | | |
| Gravity, °API | 56.4 | 54.8 | 60.2 | 60.6 | 60.6 | 66.7 |
| CFRM, clear | 74.4 | 67.0 | 75.0 | 72.9 | 71.4 | 75.0 |
| Acidity, m. e./gm | 0.0002 | 0.008 | 0.001 | 0.003 | 0.011 | 0.025 |
| Stability, Hrs. to 2# drop— | | | | | | |
| Clear | 14+ | 1.5 | 8.1 | 7.1 | 3.2 | 1.7 |
| Inhibited | | | 18.2+ | 12 | 7.8 | 2.3 |
| RVP, p. s. i. | 3.3 | 1.8 | 3.4 | 3.4 | 3.3 | 4.7 |
| Diesel Cut, 650° E. P.— | | | | | | |
| Gravity, °API | 34.7 | 38.3 | 36.5 | 36.5 | 36.5 | 35.4 |
| Cetane No. | | | 45.0 | 45.0 | 45.0 | |
| Acidity, m. e./gm | 0.001 | 0.001 | | | | 0.003 |
| Aniline Point °F | 119 | 137 | 137 | 137 | 137 | 133 |
| Wax—650° F.+Gravity, °API | 23.2 | 28.1 | 22.7 | 26.8 | 27.9 | 24.6 |

[1] A granules.  [2] A pellets.

From Table II, it is to be noted that the total liquid product containing the wax fraction gave unusual results with respect to deoxygenation, however, it is to be noted that the carbon yield is unusually high. Furthermore, this experiment was conducted for a short period of time in order to avoid the preheater coil, shown as coil 212 in Figure 2, from plugging as a result of coke production and the iron content of the oil feed. From other experiments, it was found that if the operation were continued for a longer period, the quality of the product would suffer appreciably and the coil would become fouled with iron and coke deposits. Run No. 2 illustrates the effect of nitrogen dilution in the upgrading of the total oil product. It is to be noted that there has been a significant increase in the amount of oxygenated compounds present in the product, although the carbon yield has been decreased. The decrease in deoxygenation is best illustrated by reference to the 430° end point gasoline. Run No. 3 involves an operation of 6 hours during which three samples were taken at the times designated within the table. It is to be noted, in the case of the gasoline product, that the oxygen content, measured as acidity, increased from 0.001 to 0.011 over a 6 hour period. In these runs, nitrogen was used as the inert diluent, similarly as in the case of run No. 2. Furthermore, it is to be noted that the octane quality of the gasoline product became poorer as the run proceeded. This is shown by a drop in octane number from 79.0 to 75.4 in a matter of 60 hours. These data serve to indicate that the catalyst was becoming gradually contaminated with iron which caused a reduction in the activity thereof. The other possible explanation which will be discussed hereinafter is that the catalyst became contaminated with carbon thus causing catalyst activity to decrease significantly. Run No. 4 in Table II is illustrative of a run in which both nitrogen and water were employed as the inert diluent. It should be particularly noted that while the carbon decreased significantly, the oxygen content of the gasoline product was undesirably high, thus demonstrating that the contact time was reduced to a greater extent than is desired to effect good oxygen removal.

A series of runs were made in order to determine what effect, if any, the regeneration of catalyst would have upon the deoxygenation efficiency and octane improvement of the gasoline product, when processing the total oil product from a synthesis operation including the wax fraction. These results are reported in Table III below.

Table III

| Run No | 1 | 2 | 3 | 4 | 5 |
|---|---|---|---|---|---|
| Feed | I | I | I | I | I |
| Catalyst | (¹) | (¹) | (¹) | (¹) | (¹) |
| No. of Regenerations | 1 | 2 | 3 | 0 | 1 |
| Length of Run, Hrs | 2.0 | 2.88 | 4.23 | 4.0 | 4.0 |
| Operating Conditions: | | | | | |
| Temperature, °F | 850 | 750 | 800 | 800 | 800 |
| Outlet pressure, p. s. i | 15 | 15 | 10 | 10 | 10 |
| Vol. of Catalyst, cc | 230 | 230 | 230 | 230 | 230 |
| Vol. of feed/Vol. of Catalyst (cc.) | 10.4 | 5.5 | 19.0 | 14.9 | 16.3 |
| Feed rate, cc./hr | 1,200 | 440 | 1,030 | 850 | 940 |
| H₂O rate, cc./hr | 0 | 0 | 150 | 150 | 150 |
| N₂ rate, S. C. F. H | 11 | 11 | 0 | 0 | 0 |
| Yields (Output Basis): | | | | | |
| 100% C₄ Gasoline, 430° E. P., Vol. Percent | 80.3 | 65.8 | 67.8 | 71.0 | 64.6 |
| C₄ free Gasoline, 430° E. P., Vol. Percent | 76.6 | 63.9 | 66.6 | 67.9 | 64.2 |
| Diesel Cut, 650° E. P., Vol. Percent | 16.7 | 24.1 | 23.6 | 24.6 | 21.4 |
| Polymer (650+), Vol. Percent | 4.1 | 5.7 | 10.2 | 6.1 | 15.6 |
| H₂O produced, Wt. Percent | 3.0 | 4.2 | | 1.1 | |
| Product Gas, Wt. Percent | 3.7 | 2.4 | 1.2 | 1.8 | 0.4 |
| Carbon, Wt. Percent | | 0.7 | 0.2 | | |
| Inspections: | | | | | |
| C₅—430° E. P. Gasoline— | | | | | |
| Gravity, °API | 56.1 | 54.6 | 54.3 | 56.2 | 53.0 |
| CFRM, clear | 73.0 | 65.8 | 62.5 | 71.4 | 49.8 |
| Acidity, m. e./gm | 0.005 | 0.083 | 0.185 | 0.129 | 0.200 |
| Stability, Hrs. to 2# drop— | | | | | |
| Clear | 5.4 | 1.0 | 0.6 | 0.6 | 2.0 |
| Inhibited | 8+ | 0.9 | 0.7 | 0.9 | 4.8 |
| RVP, p. s. i | 2.4 | 1.2 | 1.9 | 2.2 | 1.0 |
| Diesel Cut—650° E. P.— | | | | | |
| Gravity, °API | 34.9 | 39.2 | 39.2 | 38.2 | 40.8 |
| Cetane No | | | | | |
| Acidity, m. e./gm | 0.002 | 0.007 | 0.026 | 0.020 | |
| Aniline Point, °F | 127 | 137 | 128 | 123 | |
| Wax—650° F.+Gravity, °API | 22.1 | 26.1 | 26.9 | 25.6 | 26.5 |

¹ A granules.

Runs 1, 2 and 3 in Table III above involve regeneration of catalyst after each of the runs shown in the table. It should be noted that the oxygen content of the gasoline product measured as acidity became progressively worse, despite the regeneration of the catalyst after each run. For example, in run 1, the acidity for the gasoline product was 0.005; whereas the acidity of the same product in run 3 was 0.185. This clearly establishes that carbon deposition on the catalyst is not the prime factor for the poor deoxygenation which is obtained when processing the total liquid product from a synthesis operation. Furthermore, it should be noted that the octane improvement of the gasoline product became progressively worse than runs 1–3, inclusive, after continued use of the catalyst with intermittent regeneration. Runs 4 and 5 involved a 4 hour reaction period with the use of steam as an inert diluent. After each run, a sample of the material, which was plugging the preheater coil, shown as 212 in Figure 2, was analyzed for iron content. The sample showed 88.71% by weight of iron calculated as $Fe_2O_3$. Hence, it is to be noted that the presence of steam was not effective in overcoming the tendency for the preheater coil to plug. Furthermore, in another experiment a sample of the catalyst was analyzed for iron content and the analysis showed that 5.58% by weight if iron calculated as $Fe_2O_3$ was present. These series of runs illustrated that metal contamination of catalyst and plugging of the preheater coil due to the presence of metal contaminants in the oil feed are serious operating difficulties, notwithstanding the use of inert diluents, such as nitrogen and steam, in order to reduce the oil partial pressure under reaction conditions.

A series of runs were also made on the gasoline product obtained from a Synthol operation. The gasoline was sharply separated from the total liquid product. These data serve to give an indication of the oxygen removal and octane quality upgrading which can be effected without an adverse effect caused by the presence of the wax fraction and metal contaminants in the feed material.

Table IV

| Run No | 1 | 2 | 3 | 4 | 5 |
|---|---|---|---|---|---|
| Feed | III | IV | IV | IV | IV |
| Catalyst | (1) | (1) | (1) | (1) | (1) |
| No. of Regenerations | 0 | 1 | 2 | 3 | 4 |
| Length of run, hrs | 2 | 2 | 2 | 2 | 2 |
| Operating Conditions: | | | | | |
| Temperature, °F | 800 | 800 | 800 | 800 | 800 |
| Outlet pressure, p. s. i | 10 | 10 | 10 | 10 | 10 |
| Vol. of Catalyst, cc | 230 | 230 | 230 | 230 | 230 |
| Vol. of Feed/Vol. of Catalyst, (cc.) | 9.4 | 8.4 | 8.4 | 8.6 | 8.4 |
| Feed rate, cc./hr | 1,075 | 970 | 970 | 1,000 | 970 |
| $H_2O$ rate, cc./hr | 0 | 0 | 0 | 0 | 0 |
| $N_2$ rate, S. C. F. H | 0 | 0 | 0 | 0 | 0 |
| Yields (Output Basis): | | | | | |
| 100% $C_4$ Gasoline (430° E. P.), Vol. Percent | 95.3 | 94.7 | 95.2 | 93.2 | 95.7 |
| $C_4$ free Gasoline (430° E. P.), Vol. Percent | 87.1 | 88.2 | 88.4 | 87.4 | 89.8 |
| Polymer (430+), Vol. Percent | 3.5 | 4.3 | 3.8 | 3.7 | 2.5 |
| $H_2O$ produced, Wt. Percent | 3.0 | 1.6 | 1.7 | 2.2 | 2.5 |
| Product Gas, Wt. Percent | 2.2 | 2.7 | 2.6 | 2.0 | 2.4 |
| Inspection: | | | | | |
| $C_4$—430° F. Gasoline— | | | | | |
| Gravity, °API | 60.7 | 56.7 | 58.6 | 58.3 | 57.8 |
| CFRM, clear | 75.5 | 74.4 | 74.5 | 74.2 | 74.0 |
| Acidity, m. e./gm | 0.001 | 0.002 | 0.003 | 0.002 | 0.003 |
| Stability, hrs. 2# drop— | | | | | |
| Clear | 3.5 | | | 6.3 | 5.5 |
| Inhibited | | | | | 8+ |
| RVP, p. s. i | | 2.9 | 3.1 | 2.6 | 2.8 |

[1] A granules.

From Table IV above, it should be noted that the extent of deoxygenation and the octane quality of the product remains substantially the same over a 10 hour period with intermittent regeneration after each 2 hours of operation. As would be expected the gasoline feed material did not contain any metal contaminants and consequently, there was absent any evidence of catalyst deactivation and preheater coil plugging.

Another series of runs were made involving the evaluation of a liquid product from a Synthol operation including only the gasoline and diesel oil products. These fractions were separated from a wax fraction by distilling under vacuum at 400° F. and 1 mm. Hg. The results of these runs are reported in Table V.

heater coil did not plug nor was there evidence of plugging at the end of run No. 5 in the above table. In the first five runs, steam was employed as the inert diluent and the results obtained therefrom as previously indicated were quite unusual considering that the use of the total liquid product including the wax fraction caused adverse effects notwithstanding the employment of steam. Run No. 6 in Table V involves an operation in which an inert diluent was not employed. This run was made over a 4 hour period following which there was no evidence of preheater coil plugging and as is noted from the table above, the same gasoline product upgrading and more effective deoxygenation achieved.

The treated product derived by processing a synthesis

Table V

| Run No | 1 | 2 | 3 | 4 | 5 | 6 |
|---|---|---|---|---|---|---|
| Feed | V | V | V | V | V | VII |
| Catalyst | (a) | (a) | (a) | (a) | (a) | (a) |
| No. of Regenerations | 0 | 1 | 2 | 3 | 4 | 0 |
| Length of Run, hrs | 4 | 4 | 4 | 4 | 4 | 4 |
| Operating Conditions: | | | | | | |
| Temperature, °F | 802 | 800 | 800 | 801 | 806 | 807 |
| Outlet pressure, p. s. i | 10 | 10 | 10 | 10 | 10 | 10 |
| Space Vel., $V_o$/hr./$V_c$ | 4.3 | 4.2 | 4.3 | 4.1 | 4.1 | 4.1 |
| Feed Rate, cc./hr | 998 | 958 | 994 | 950 | 956 | 954 |
| $H_2O$ rate, cc./hr | 166 | 190 | 158 | 160 | 152 | |
| Yields (Output Basis): | | | | | | |
| 100% $C_4$ Gasoline (430° E. P.), Vol. percent | 86.9 | 83.9 | 82.7 | 82.4 | 84.1 | 87.1 |
| 430 E. P. Gasoline ($C_4$ free), Vol. percent | 80.8 | 79.5 | 79.4 | 79.7 | 81.1 | 79.6 |
| Diesel Cut (650° E. P.), Vol. percent | b 11.7 | c 8.6 | c 11.2 | d 4.4 | d 4.1 | 11.5 |
| Polymer (650°+), Vol. percent | 0.6 | 1.5 | 1.3 | 1.5 | 0.9 | 1.1 |
| $H_2O$ produced, Wt. percent | 3.0 | 3.2 | 1.4 | 2.3 | 1.3 | 2.4 |
| Product Gas, Wt. percent | 2.1 | 1.7 | 1.4 | 1.2 | 1.3 | 2.8 |
| Inspections: | | | | | | |
| $C_4$ free—430° E. P. Gasoline— | | | | | | |
| Gravity, °API | 57.8 | 57.1 | 56.1 | 56.1 | 56.1 | 58.6 |
| Octane No. CFRM, clear | 74.9 | 73.2 | 72.0 | 71.3 | 71.5 | 74.9 |
| Acidity, m. e./gm | 0.04 | 0.05 | 0.07 | 0.07 | 0.07 | 0.001 |
| RVP, p. s. i | 2.9 | 2.5 | 2.0 | 1.9 | 1.7 | 3.3 |
| Stability, hrs. to 2# drop— | | | | | | |
| Clear | 4.0 | | 5.5 | 3.4 | 3.9 | 6.1 |
| Inhibited | 4.5 | 5.0 | 6.0 | 5.6 | | 15.0 |
| Diesel Cut— | | | | | | |
| Gravity, °API | 34.9 | 35.7 | 37.5 | 35.0 | 35.4 | 32.3 |
| Cetane No | 45 | 47 | 47 | 56 | 56 | 45 |
| Aniline Pt., °F | | | | 152 | 152 | |
| Maximum Pour Pt., °F | | | | +25 | +25 | +10 | a A granules.
b 470°–650° F.
c 500°–650° F.
d 550°–650° F.

In Table V above, it is demonstrated that the deoxygenation remains fairly constant over an extended period of reaction namely, 20 hours with intermittent regeneration of catalyst after each 4 hour period of operation. Furthermore, the quality of the gasoline is substantially the same notwithstanding the long period of treatment. During these series of runs, it was noted that the preheater coil did not plug nor was there evidence of plugging product including the gasoline and diesel oil fractions was blended with the original wax fraction, which was separated from the feed material prior to the upgrading operation by distillation under vacuum at 400° F. and 1 mm. Hg. This experiment was performed in order to determine whether any serious disadvantages accrued from blending the wax fraction with the treated mixture of gasoline and diesel oil fractions, when the feed is prepared by proper fractionation. A sample of the diesel oil product of run No. 1 was allowed to stand for eight months, after which time the NPA color was 2–2.5. This illustrates the stability of the diesel fraction as a result of upgrading. The results are reported in Table VI below.

Table VI

| Run No | 1 | 2 |
|---|---|---|
| Feed | VI | |
| Catalyst | (¹) | |
| No. of Regenerations | 5 | |
| Length of Period, hrs | 6 | |
| Operation Conditions: | | |
| Temperature, °F | 805 | |
| Outlet Pressure, p. s. i | 10 | |
| Space Vel., V₀/hr./V_c | 4.2 | |
| Feed Rate, cc./hr | 970 | |
| Yields (Output Basis): | | |
| 100% C₄ Gasoline (430° E. P.), Vol. percent | 85.7 | |
| 430° E. P. Gasoline (C₄ free), Vol. percent | 82.4 | |
| Diesel Cut (650° E. P.), Vol. percent | 11.3 | |
| Polymer (650+), Vol. percent | 0.9 | |
| H₂O produced, Wt. percent | 2.1 | |
| Product Gas, Wt. percent | 1.3 | |
| Carbon, Wt. percent | 0.3 | |
| Polymer (650+) added to Liquid Product, Wt. percent | | 5.7 |
| Inspections: | | |
| C₄ free Gasoline (430° E. P.)— | | |
| Gravity, °API | 61.8 | 62.0 |
| Octane—CFRM, clear | 72.9 | 72.9 |
| Acidity, m.e./gm | 0.002 | 0.003 |
| Oxygen stability—hrs. to 2# drop— | | |
| Clear | 3.5 | 2.7 |
| Inhibited | 10.7 | 13.9 |
| RVP, p. s. i | 3.5 | 3.5 |
| Diesel Cut (650° E. P.)— | | |
| Gravity, °API | 37.2 | 38.1 |
| Maximum Pour Pt., °F | +5 | +5 |
| Aniline Point, °F | 141 | 141 |
| Cetane No | 46 | 46 |
| Acidity, m.e./gm | 0.002 | 0.003 |

¹ A granules.

It should be noted from Table VI above, that the addition of the wax fraction increased the oxygen content of the gasoline product from 0.002 to 0.003. The stability of the gasoline was not significantly affected by the increase in oxygen content as is evident from the data. Furthermore, the same increase in oxygen content is noted for the diesel cut, however, the cetane number remains substantially the same. In all likelihood, an increase was not noted because the amount of material added to the treated product, which boiled below about 650° F. was not sufficient in quantity to reflect an increase in cetane number. On the other hand, the octane number of the gasoline product remained the same, illustrating that no adverse effects are to be expected from the blending step.

Having thus described our invention by reference to specific examples, it should be understood that no undue limitations or restrictions are to be imposed by reason thereof, but that the scope of the present invention is defined by the appended claims.

We claim:

1. A process which comprises separating a hydrocarbon oil containing diesel oil, wax, oxygenated organic compounds and metal contaminants which are derived from the hydrogenation of carbon monoxide into a relatively high boiling fraction containing wax, diesel oil and substantially all of said metal contaminants and a relatively low boiling fraction containing diesel oil and oxygenated organic compounds and substantially free from said metal contaminants, contacting said relatively low boiling fraction with an alumina-containing catalyst at an elevated temperature suitable for deoxygenation to produce water, removing water from product of the aforesaid alumina treating step, recombining product containing diesel oil from said alumina treating step with relatively high boiling constituents including diesel oil of said initial separation, subjecting the resulting combined mixture to a distillation step to recover a diesel oil fraction containing components derived from both said high boiling and said low boiling fractions of said initial separation and a higher boiling fraction containing wax and substantially all of said metal contaminants.

2. A process which comprises separating a hydrocarbon oil containing diesel oil, wax, oxygenated organic compounds and metal contaminants which are derived from the hydrogenation of carbon monoxide into a relatively high boiling fraction containing wax, diesel oil and substantially all of said metal contaminants and a relatively low boiling fraction having an end point between about 650 and about 750° F. and containing diesel oil and oxygenated organic compounds and substantially free from said metal contaminants, contacting said relatively low boiling fraction with an alumina-containing catalyst at an elevated temperature suitable for deoxygenation to produce water, removing normally gaseous product and water from product of the aforesaid alumina treating step, recombining liquid product containing diesel oil from said alumina treating step with relatively high boiling constituents including diesel oil of said initial separation, subjecting the resulting combined mixture to a distillation step to recover a diesel oil fraction containing components derived from both said high boiling and said low boiling fractions of said initial separation and a higher boiling fraction containing wax and substantially all of said metal contaminants.

3. A process which comprises separating a hydrocarbon oil containing diesel oil, wax, oxygenated organic compounds and metal contaminants which are derived from the hydrogenation of carbon monoxide into a relatively high boiling fraction containing wax, diesel oil and substantially all of said metal contaminants and a relatively low boiling fraction containing diesel oil and oxygenated organic compounds and substantially free from said metal contaminants, contacting said relatively low boiling fraction with a silica-alumina catalyst comprising about 75 to about 80 per cent by weight of silica and not more than about 0.1 per cent by weight of iron calculated as $Fe_2O_3$ at an elevated temperature of about 750° to about 850° F. at a pressure of about one atmosphere to about 20 p. s. i. g. and a volumetric space velocity of about 2 to about 5 suitable for deoxygenation to produce water, removing water from product of the aforesaid alumina treating step, recombining product containing diesel oil from said alumina treating step with relatively high boiling constituents including diesel oil of said initial separation, subjecting the resulting combined mixture to a distillation step to recover a diesel oil fraction containing components derived from both said high boiling and said low boiling fractions of said initial separation and a high boiling fraction containing wax and substantially all of said metal contaminants.

4. A process which comprises separating a hydrocarbon oil containing diesel oil, wax, oxygenated organic compounds and metal contaminants which are derived from the hydrogenation of carbon monoxide into a relatively high boiling fraction containing wax, diesel oil and substantially all of said metal contaminants and a relatively low boiling fraction having an end point of about 650° to about 750° F. and containing diesel oil and oxygenated organic compounds and substantially free from said metal contaminants, contacting said relatively low boiling fraction with a silica-alumina catalyst comprising about 70 to about 99 per cent by weight of silica at an elevated temperature of about 750° to about 850° F., a pressure about one atmosphere to about 20 p. s. i. g. and a weight space velocity of about 2 to about 5 suitable for deoxygenation to produce water, removing water from product of the aforesaid alumina treating step, recombining product containing diesel oil from said alumina treating step with relatively high boiling constituents including diesel oil of said initial separation, subjecting the resulting combined mixture to a distillation step to recover a diesel oil fraction having an end point of about 650 to about 750° F. containing components derived from both said high boiling and said low boiling fractions of said initial separation and a high boiling fraction containing wax and substantially all of said metal contaminants.

References Cited in the file of this patent

UNITED STATES PATENTS

| | | |
|---|---|---|
| 2,264,427 | Asbury | Dec. 2, 1941 |
| 2,452,121 | Grahame | Oct. 26, 1948 |
| 2,461,069 | Marisic et al. | Feb. 8, 1949 |
| 2,501,223 | Johnson | Mar. 21, 1950 |
| 2,516,699 | Hemminger | July 25, 1950 |
| 2,545,954 | Hockberger | Mar. 20, 1951 |
| 2,556,275 | Hemminger | June 12, 1951 |
| 2,569,463 | Du Bois Eastman | Oct. 2, 1951 |
| 2,574,355 | Smith | Nov. 6, 1951 |
| 2,581,560 | Shankland et al. | Jan. 8, 1952 |
| 2,598,647 | McGrath | May 27, 1952 |
| 2,600,452 | Voorhies | June 17, 1952 |
| 2,615,036 | Fleming et al. | Oct. 21, 1952 |

FOREIGN PATENTS

| | | |
|---|---|---|
| 647,467 | Great Britain | Dec. 13, 1950 |
| 860,383 | France | Sept. 30, 1940 |